United States Patent [19]
Dellande et al.

[11] Patent Number: 4,569,062
[45] Date of Patent: Feb. 4, 1986

[54] INTERFACE CIRCUIT FOR INTERFACING BETWEEN ASYNCHRONOUS DATA IN START/STOP FORMAT AND SYNCHRONOUS DATA

[76] Inventors: Brian W. Dellande, 1110 Stoneoak, Austin, Tex. 78745; Henry Wurzburg, 12506 Wistful Cir., Round Rock, Tex. 78664

[21] Appl. No.: 625,870

[22] Filed: Jun. 28, 1984

[51] Int. Cl.[4] .................... H04L 25/38; H04L 7/04; H04L 5/24
[52] U.S. Cl. .................................. 375/117; 375/108; 370/48
[58] Field of Search ............... 375/117, 112, 7, 121, 375/108; 370/48, 99; 179/2 DP

[56] References Cited

U.S. PATENT DOCUMENTS 4,263,673  4/1981  Bingham et al. .................. 375/117
4,432,089  2/1984  Wurzburg et al. ............... 370/110.1

OTHER PUBLICATIONS

Wurzburg; "Proceedings of the National Electronics Conference;" vol. 37; Oct. 24–26, 1983; Marriot Oak Brook Hotel, Oak Brook, Ill.; pp. 501–506.

Wurzburg et al.; "PBX–Based LANS: Lower Cost per Terminal Connection;" Reprinted from *Computer Design;* Feb. 1984.

*Primary Examiner*—Marc E. Bookbinder
*Assistant Examiner*—A. Telesz

[57] ABSTRACT

A data interface circuit for interfacing between an asynchronous data source providing data in start/stop format and a synchronous data communication channel is provided. The data interface circuit has a transmit portion and a receive portion which function independently. Upon receipt of asynchronous data, the transmit portion strips start and stop bits from the data and transmits the data in data frames of variable length characterized by beginning and ending with synchronizing idle codes. The synchronizing idle codes are transmitted in the absence of data to maintain synchronization. A code circuit insures that a data word is never the same as the idle code. Similarly, upon receipt of synchronous data and idle codes, the receive portion stores the data and controllably adds start and stop bits. Data in start/stop format is asynchronously provided at an output of the receive portion.

13 Claims, 18 Drawing Figures

INTERFACE CIRCUIT FOR INTERFACING BETWEEN ASYNCHRONOUS DATA IN START/STOP FORMAT AND SYNCHRONOUS DATA

CROSS REFERENCE TO RELATED APPLICATION

This application is related to the following copending application filed simultaneously herewith and assigned to the assignee hereof: "A Simultaneous Voice and Asynchronous Data Telephone", Ser. No. 06/625,871.

FIELD OF THE INVENTION

This invention relates generally to data interface circuits and, more particularly, to an interface circuit for interfacing between asynchronous data in start/stop format and synchronous data.

BACKGROUND OF THE INVENTION

In the data communication field, data is commonly transmitted asynchronously wherein the beginning of a group of bits of digital data are indicated by a start bit and the end of the data is indicated by one or more stop bits. High speed digital data links frequently utilize synchronous data transmissions such as the digital loop transceiver system taught in U.S. Pat. No. 4,432,089. Therefore, an interface must be provided whenever a synchronous data system is used in an asynchronous data environment.

Others have interfaced voice and asynchronous data and synchronous data in a two or four wire communication system by an oversampling technique utilizing a synchronous channel data rate which is at least twice the actual data rate. In the oversampling technique, a data sample is treated like a signal on a D.C. line. As a practical matter however, the channel data rate must be four or five times the real data rate to minimize channel edge jitter. Others have interfaced asynchronous and synchronous data by utilizing high speed synchronous protocols such as synchronous data link control (SDLC) or full high level data link control (HDLC) having control fields which identify when breaks between asynchronous bursts of digital data occur. However, these synchronous protocols require external intelligence and generally a synchronous channel bandwidth greater than the asyhcnronous data transmission rate. For example, using conventional means such as modems used with asynchronous to synchronous converters it is generally impossible to transmit asynchronous data at 9600 bits per second (bps) in a conventional synchronous 8 K bits per second channel typically provided by recently developed digital telephone networks.

SUMMARY OF THE INVENTION

Accordingly, an object of the present invention is to provide an interface circuit for interfacing between asynchronous data in start/stop format and synchronous data.

Another object of the present invention is to provide improved asynchronous to synchronous and synchronous to asynchronous data conversion in a data communication system.

Yet another object of the present invention is to provide an improved interface between a synchronous data channel of a digital telephone set and an asynchronous data source.

In carrying out the above and other objects of the present invention, there is provided, in one form, an interface circuit for interfacing between a data terminal which provides asynchronous data in start/stop format and a synchronous communication channel. Upon receipt of the asynchronous data, a transmit portion synchronously transmits data to the synchronous communication channel. When the interface circuit is not receiving asynchronous data from the data terminal, the transmit portion synchronously transmits an idle code to the communication channel. A receive portion of the interface circuit sychronously receives either data or an idle code from the communication channel. In response to the receipt of the idle code from the communication channel, the receive portion provides no information to the data terminal. In response to data from the communication channel, the receive portion provides the data to the data terminal in start/stop format. Therefore, the interface circuit provides asynchronous data to the asynchronous data terminal and synchronous data to the synchronous communication channel.

DETAILED DESCRIPTION OF THE INVENTION

Figure 1:
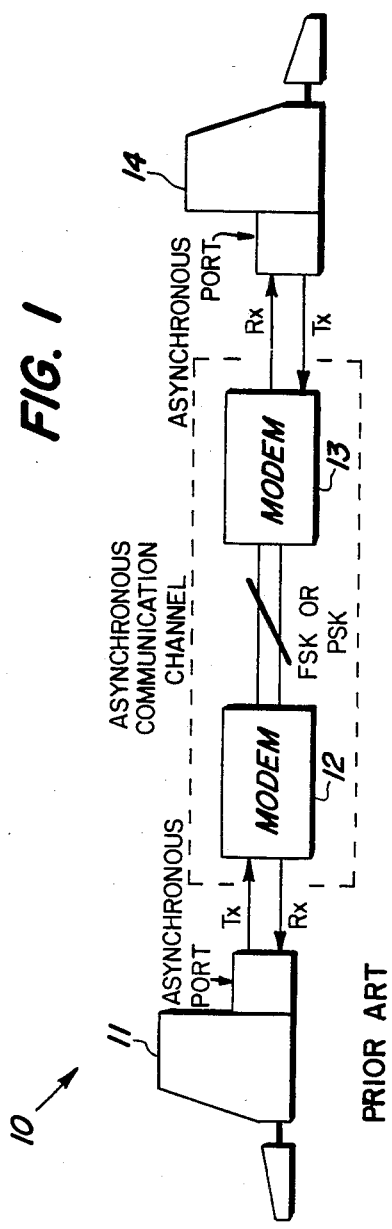
FIG. 1 illustrates in block diagram form an asynchronous communication system known in the art.

Shown in FIG. 1 is a conventional asynchronous communication system 10 having a data terminal 11 with an asynchronous port having a transmit "Tx" terminal and a receive "Rx" terminal. System 10 has an asynchronous communication channel comprising modems 12 and 13. A first input of modem 12 is coupled to the transmit output of data terminal 11 and a first output of modem 12 is coupled to a first input of modem 13. A second output of modem 12 is coupled to an input of the asynchronous port of data terminal 11. A first output of modem 13 is coupled to a recieve "Rx" input of an asynchronous port of a data terminal 14. A transmit "Tx" output of data terminal 14 is coupled to a second input of modem 13. A second output of modem 13 is coupled to a second input of modem 12. Typically, either conventional FSK or PSK transmission is utilized between modems 12 and 13.

Figure 2:
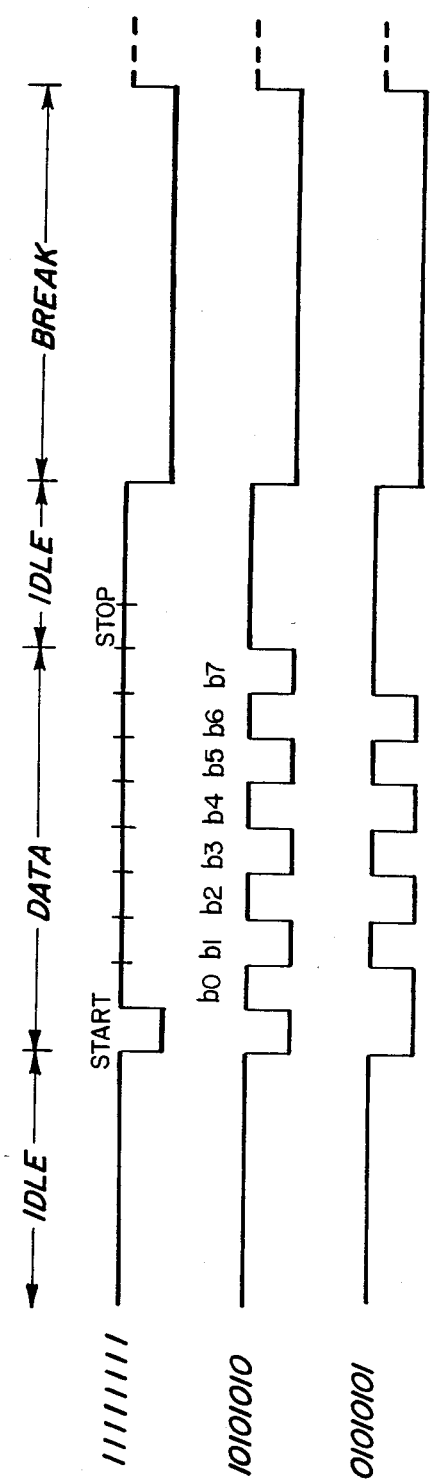
FIG. 2 illustrates in graphical form data transmissions associated with the system of FIG. 1.

Referring to FIG. 2, communication system 10 is an asynchronous system which transmits data between data terminals 11 and 14 by start and stop bits. When no data is transmitted between terminals 11 and 14, system 10 is in an idle mode which is illustrated as a constant high logic level. After an initial start bit which is indicated by a transition to a low logic level, eight data bits $b_0$ thru $b_7$ are transmitted from data terminal 11 to modem 12. A stop bit is indicated by a high logic level and signals the end of a data transmission. Examples of data transmissions for the following eight bit words "11111111", "10101010" and "01010101" are illustrated in FIG. 2. A break code is provided by a continuous low logic level. However, in an asynchronous communication channel the start and stop bits must be transmitted between the modems along with the data. The additional overhead created by the start and stop bits increases the bandwidth and slows the data rate.

Figures 3, 4:
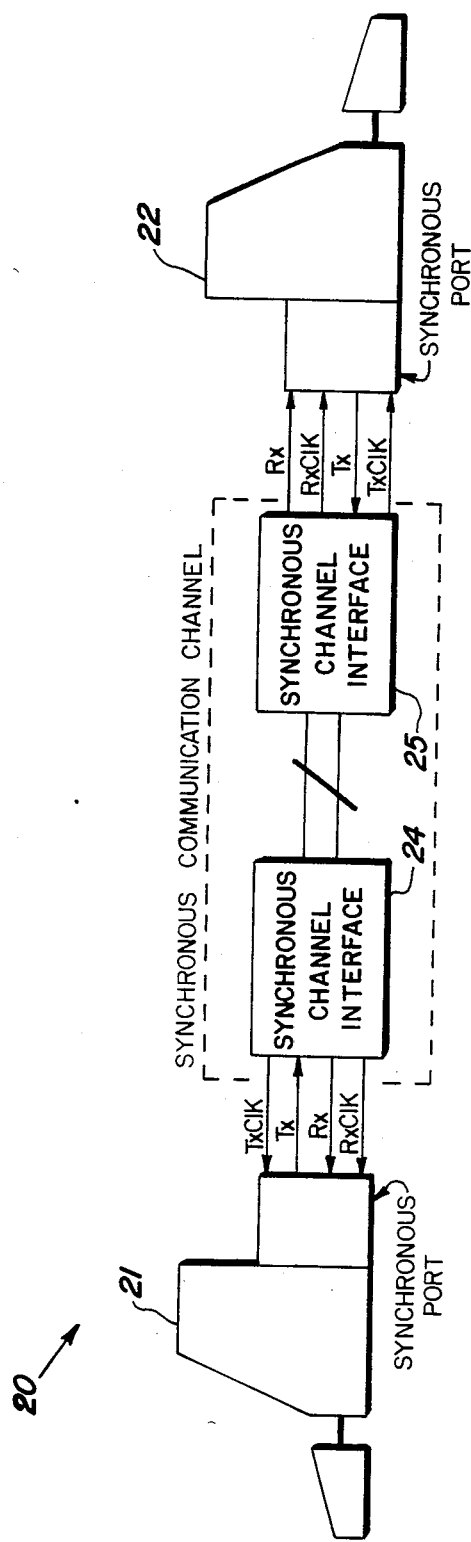
FIG. 3 illustrates in block diagram form a synchronous communication system also known in the art.
FIG. 4 illustrates in graphical form data transmissions associated with the system of FIG. 3.

Shown in FIG. 3 is a conventional synchronous communication system 20 for synchronously transmitting data between data terminals 21 and 22 via a synchronous communication channel comprising synchronous channel interface circuits 24 and 25. Data terminal 21 has a synchronous port with a first input labeled "Tx Clk" coupled to a first output of synchronous channel interface circuit 24. A first output of data terminal 21 labeled "Tx" is coupled to a first input of circuit 24. A communications link is provided between interface circuits 24 and 25. A second output of circuit 24 labeled "Rx" is coupled to a second input of the synchronous port of data terminal 21. A third output of circuit 24 labeled "Rx Clk" is coupled to a third input of the synchronous port of terminal 21. A first output of circuit 25 labeled "Rx" is coupled to a first input of a synchronous port of data terminal 22. A second output of circuit 25 labeled "Rx ClK" is coupled to a second input of the synchronous port of data terminal 22. An output of the synchronous port of data terminal 22 labeled "Tx" is coupled to an input of circuit 25, and a third output of circuit 25 labeled "Tx Clk" is coupled to a third input of data terminal 22. Data is typically transferred between data terminals 21 and 22 by using any one of many conventional protocols such as SDLC or HDLC.

Shown in FIG. 4 are waveforms of synchronous signals sent by data terminal 21 to circuit 24. Although only a transmit signal and a transmit clock signal are illustrated, it should be clear that the receive signal and the receive clock signal are respectively analogous. Data is synchronously transmitted in response to the "Tx Clk" clock signal which functions as a bit clock. In response to a low to high transition of the "Tx" clock signal, the transmitted data either changes logic level or remains the same for the next clock bit interval. In addition, synchronous communication system 20 requires a frame clock which indicates where data word boundaries exist since the transition of data with no point of reference is meaningless. Two previous methods to provide frame synchronization in a synchronous environment have included the use of a seperate framing signal or the use of a protocol which has synchronizing patterns for synchronization. Since a seperate framing signal requires an additional conductor and a variable frequency signal is needed for varying data rates, the use of such a signal is not typically feasible. Therefore, conventional synchronous protocols such as SDLC or HDLC are typically utilized. Synchronous communication channels are widely found in digital private automatic branch exchanges and typically correspond to dedicated equipment. However, typical commercial data terminal equipment is usually asynchronous. Therefore, in order to use the majority of presently existing communication equipment, an interface between asynchronous and synchronous equipment is required.

Figure 5:
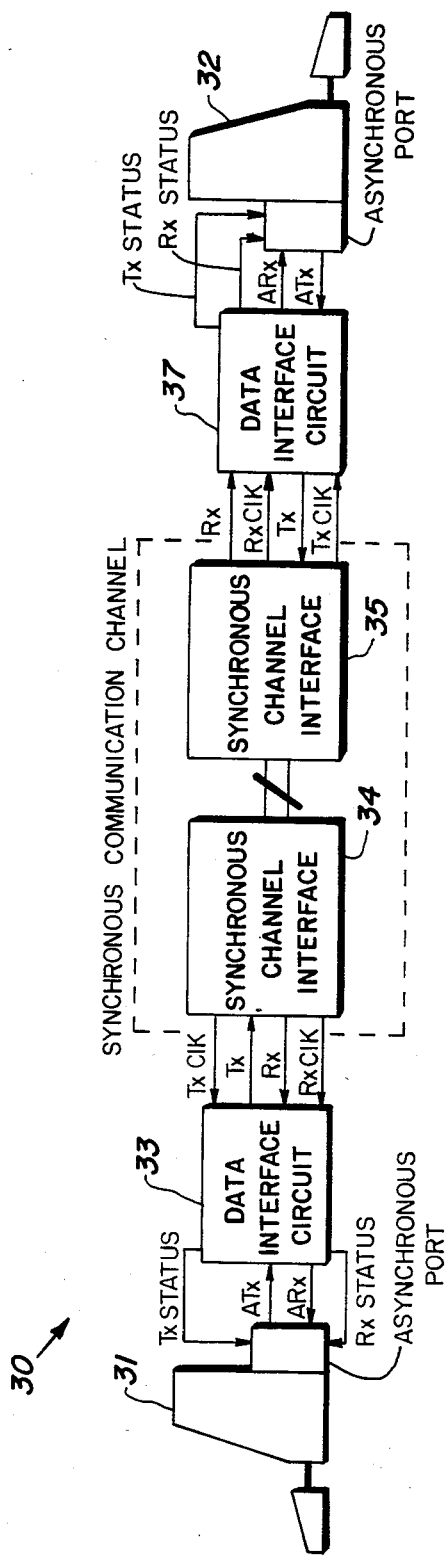
FIG. 5 illustrates in block diagram form a communication system utilizing the present invention.

Shown in FIG. 5 is an asynchronous/synchronous communication system 30 comprising data terminals 31 and 32 each having an asynchronous port. An output of data terminal 31 labeled "ATx" is coupled to a first input of a data interface circuit 33 constructed in accordance with the present invention. A first output of circuit 33 labeled "ARx" is coupled to a first input of data terminal 31. A second output of circuit 33 labeled "Tx Status" is coupled to a second input of data terminal 31. A third output of circuit 33 labeled "Rx Status" is coupled to a third input of data terminal 31. A fourth output of circuit 33 labeled "Tx" is coupled to a first input of circuit 34. A first output of circuit 34 labeled "Tx Clk" is coupled to a second input of circuit 33, and a second output of circuit 34 labeled "Rx" is coupled to a third input of circuit 33. A third output of circuit 34 labeled "Rx Clk" is coupled to a fourth input of circuit 33. Synchronous channel interface circuits 34 and 35 are coupled via one of numerous forms of possible communication channels. A first output of circuit 35 labeled "Rx" is coupled to a first input of a data interface circuit 37. In a preferred form, circuits 33 and 37 are identical and circuits 34 and 35 are identical. A second output of circuit 35 labeled "Rx Clk" is coupled to a second input of circuit 37. A third output of circuit 35 labeled "Tx Clk" is coupled to a third input of circuit 37. A first output of circuit 37 labeled "Tx" is coupled to an input of circuit 35. A second output of circuit 37 labeled "ARx" is coupled to an input of an asynchronous port of data terminal 32. An output of the asynchronous port of data terminal 32 labeled "ATx" is coupled to a fourth input of interface circuit 37.

In operation, asynchronous/synchronous system 30 utilizes asynchronous data from remote terminals 31 and 32 and converts asynchronous data from both terminals to synchronous data. Synchronous data is then utilized in a conventional manner by conventional synchronous channel interface circuitry 34 and 35 and transmitted over a medium such as an existing telephone circuit. The present invention embodies the concept of utilizing a synchronous communication channel with asynchronous data terminal equipment. The advantage of using a synchronous communication channel is increased utilization of bandwidth as opposed to the method of bandwidth utilization of an asynchronous channel. The increased utilization of bandwidth improves speed.

Figure 6:
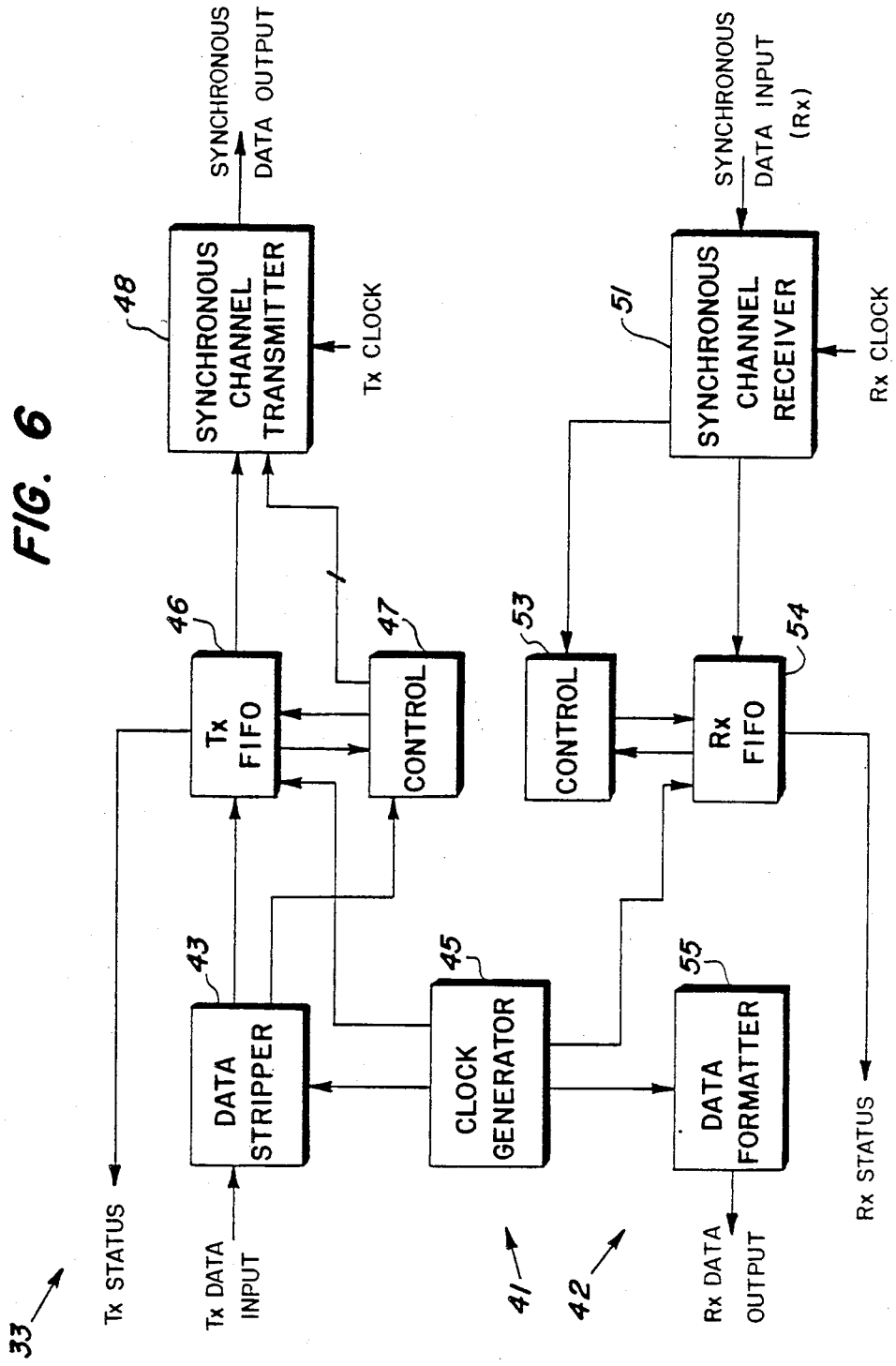
FIG. 6 illustrates in block diagram form an interface circuit in accordance with the present invention.

Referring to FIG. 6, interface circuit 33 generally comprises a transmit portion 41 and a receive portion 42. Transmit portion 41 comprises a data stripper circuit 43 having a first input for receiving asynchronous data transmitted from a data terminal such as terminal 31. A second input of data stripper circuit 43 is coupled to a first output of a clock generator circuit 45. A first output of data stripper circuit 43 is coupled to a first input of a transmit FIFO register 46 labeled "Tx FIFO". A second output of data stripper 43 is coupled to a first input of a first control circuit 47. A second input of transmit FIFO circuit 46 is coupled to a first output of first control circuit 47. A second output of clock generator 45 is coupled to a third input of transmit FIFO circuit 46. A first output of transmit FIFO circuit 46 is coupled to a second input of first control circuit 47 and provides an occupancy control signal to the control means for indicating when a data transmission is to occur. A second output of the transmit FIFO circuit 46 is coupled to a first input of a synchronous channel transmitter 48. A second output of first control circuit 47 is coupled to a second input of synchronous channel transmitter 48. A third output of the transmit FIFO circuit 46 provides a transmit status signal labeled "Tx Status". A transmit clock signal is coupled from synchronous channel interface circuit 35 to a third input of synchronous channel transmitter 48. An output of synchronous channel transmitter 48 provides synchronous output data.

Receive portion 42 comprises a synchronous channel receiver 51 having a first input for receiving synchronous input data, a second input for receiving a receive clock from synchronous channel interface circuit 34, a first output coupled to a first input of a second control circuit 53, and a second output coupled to a first input of a receive FIFO 54. An output of control circuit 53 is coupled to a second input of receive FIFO 54, and an output of clock generator 45 is coupled to a third input of receive FIFO 54. A first output of receive FIFO 54 is coupled to a second input of the second control circuit 53 to provide a second occupancy control signal, and a second output of receive FIFO 54 is coupled to a first input of a data formatter 55. A third output of receive FIFO 54 provides a receive status signal. A second input of data formatter 55 is coupled to a second output of clock generator 45. An output of data formatter 55 provides asynchronous data in start/stop format.

In operation, transmit portion 41 and receive portion 42 function independently of each other. Transmit portion 41 functions to receive asynchronous data in start/-stop format from an asynchronous data terminal. Data stripper circuit 43 strips the start and stop bits off of the data at a rate determined by clock generator 45. The data is then coupled to transmit FIFO 46 and loaded into FIFO 46. Transmit FIFO 46 functions as a rate adaption device. The asynchronous side of interface circuit 33 is operating at a different clock rate from the synchronous side because of the difference in data format. Therefore, buffering is required to absorb clock rate slips as they occur. In a preferred form, transmit FIFO 46 may hold up to four words of data with each word containing either eight or nine bits. Should asynchronous data be received faster than the synchronous output data rate, transmit FIFO 46 may become full of data. Before transmit FIFO 46 is completely full, a transmit status signal may be sent from transmit FIFO 46 to the asynchronous data terminal to function as a clear to send signal indicating that more data either may or may not be received and stored. Control circuit 47 monitors both FIFO circuit 46 and synchronous channel transmitter 48 as described below so that data is outputted from transmitter 48 in a synchronous protocol. When data is not being received in start/stop format by data stripper 43 and transmit FIFO 46 is not full, synchronous channel transmitter 48 continuously outputs a synchronous flag code to the synchronous communication channel. In addition, whenever a break signal is received from data terminal 31, synchronous channel transmitter 48 also outputs a break code which is synchronous with both flag code and data transmissions.

Similarly, synchronous channel receiver 51 of interface circuit 33 will continuously receive either synchronous data, idle flag codes or break codes via the synchronous communication channel from interface circuit 37. Once data is received, the data is coupled to receive FIFO 54 and loaded into FIFO 54 at a rate determined by the receive clock which is coupled to receive FIFO 54 and by a clock signal provided by clock generator 45. Similar to FIFO 46, receive FIFO 54 functions as a rate adaption device. Receive FIFO 54 in conjunction with control circuit 53 couples data to data formatter 55 at a hybrid clock rate determined by both clock generator 45 and the receive clock. Data formatter 55 receives data and formats the data by adding start and stop bits to each data word. When an idle flag code is received by synchronous channel receiver 51, data formatter 55 provides a continuous high logic level output signal, and when a break signal is received by receiver 51, a low logic level output is provided by data formatter 55. Data is outputted by data formatter 55 at a rate controlled by clock generator 45. Should the data rate at the synchronous data input be greater than the output data rate of data formatter 55, receive FIFO 54 may be overwritten resulting in a possible loss of data. Should a data word be lost, a receive status signal may be coupled from receive FIFO 54 to data terminal 31 to indicate loss of a data word. It should be well understood that use of either the transmit status signal or the receive status signal requires an additional conductor which is not available in a two wire communication link. Therefore, these signals are optional depending upon whether additional conductors between interface circuit 33 and data terminal 31 are available.

Figure 7:
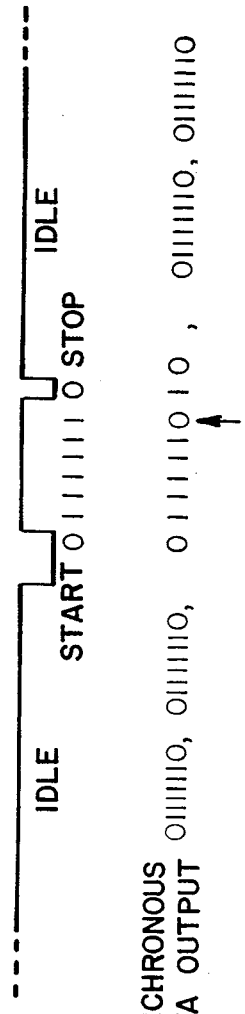
FIG. 7 illustrates in graphical form data transmissions associated with the circuit of FIG. 6.

Referring to FIG. 7, an example of the operation of transmit portion 33 is illustrated for an eight bit asynchronous data word transmitted by data terminal 31. When data terminal 31 is idle, a continuous high level is coupled to interface circuit 33 which couples an idle code in the form of "01111110" to the synchronous communication channel. Since synchronous communication channel interface circuit 34 inherently requires a continuous synchronous signal, interface circuit 33 must provide such a signal. The idle code contains eight bits and functions to maintain continuous synchronization. Data is transmitted in the form of frames using a bit oriented protocol with each frame beginning with the idle codes. A frame further comprises one or more data words with each word typically having eight bits, and a frame is closed by further idle codes "01111110". Although frames may constantly vary in width depending upon the number of consecutively transmitted data words, each frame is identifiable because a frame begins and ends with a flag and contains only nonflag bit patterns in the middle. To guarantee that no data patterns are mistaken for the idle code flag, means are provided to insure that no data transmission contain more than five consecutive binary ones. Only idle codes and break codes are permitted to have more than five consecutive binary ones. Therefore, any time five consecutive data bits which are a binary one occur as shown in FIG. 7, a zero indicated by an arrow in FIG. 7 is inserted before the next data bit occurs. The zero bit insertion means is disabled for the periods when the idle code flag is being sent. Since the idle code flag identifies word boundaries, frame or word synchronization is maintained by use of the protocol. Data words are identified from idle code flags and break codes by counting up to a predetermined number of bits, typically eight, beginning with the last bit of the flag idle code. Once the counter has counted up to the predetermined number, a decision as to what type of word has been counted is made. If the accumulated bit pattern is not another idle code, the accumulated data pattern must be a data word. After the predetermined number of bits have been counted, the counter is zeroed and the same procedure is continuously repeated. Logic circuitry insures that inserted zeros discussed above are not counted.

Whenever asynchronous data is received from an asynchronous data terminal, a low logic level start bit indicates the beginning of a data word. Data stripper 43 detects a high to low logic level transition and uses a fast data clock to time out the approximate center of the start bit. At the time of the center of the start bit, the input is again checked to make sure that a low logic level exists. If a high logic level exists, a false start is assumed and data stripper 43 returns to an idle state. However, if at the time of the approximate center of the start bit the low logic level still exists, data stripper 43 becomes committed to accept a predetermined number of data bits such as eight.

Figure 8:
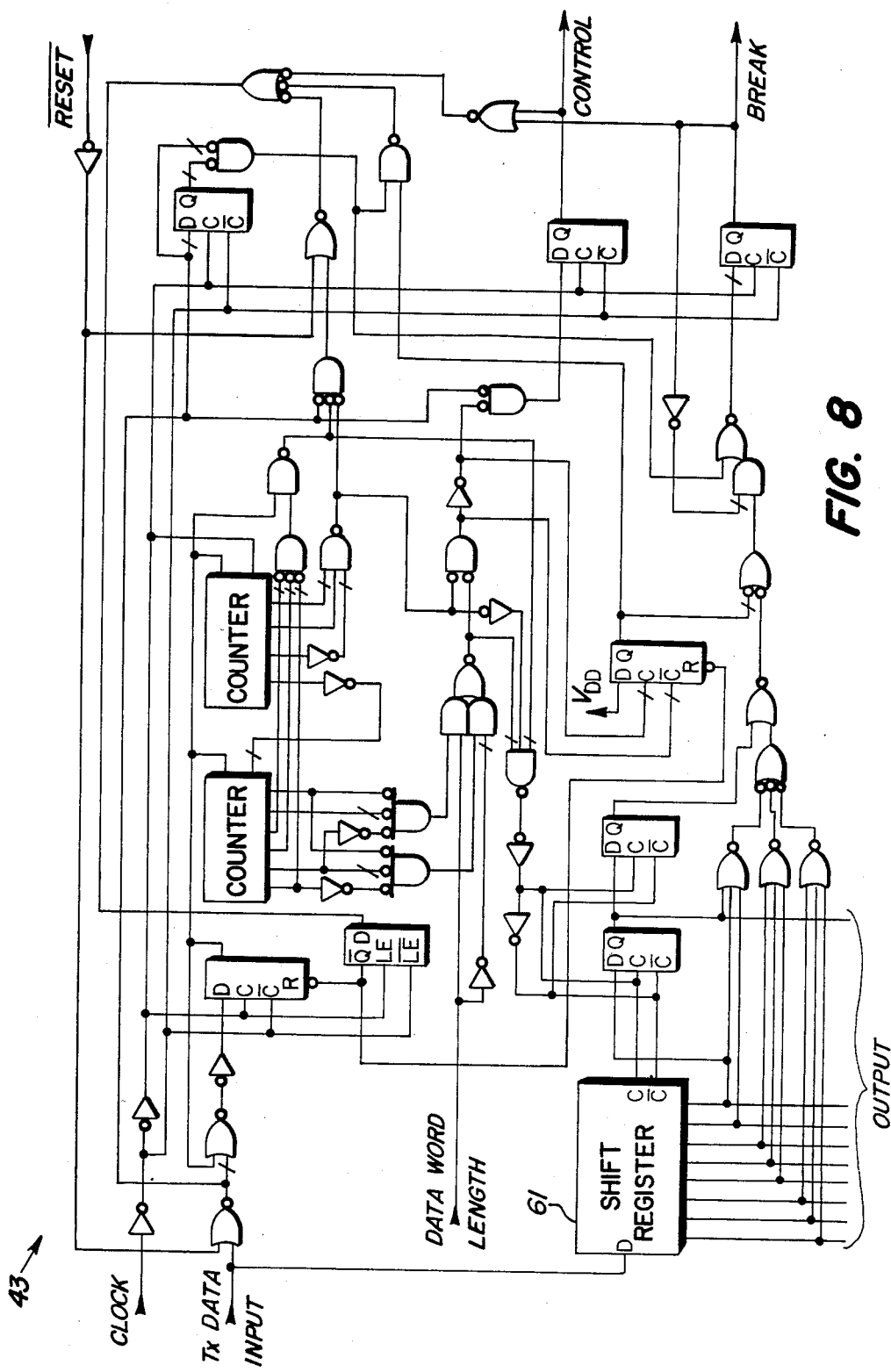
FIG. 8 illustrates in logic diagram form a data stripper circuit of the interface circuit of FIG. 6.

Shown in FIG. 8 is a schematic of one of many possible implementations of data stripper 43. A timing clock provided by clock generator 45 is used to shift in all bits of the data word into a shift register 61. The data input of data stripper 43 is then sampled to determine whether a high level stop bit is present. If the stop bit is present, the data bits are strobed into transmit FIFO 46 by clock generator 45. If the high logic level of the stop bit is not sensed at the data input, the data bits in data stripper 43 are not strobed into transmit FIFO 46. After the middle of the stop bit period has been reached, data stripper 43 returns to an idle state waiting for another high to low level transition at the input. If data terminal 31 transmits a break signal by maintaining the data line at a low level a predetermined number of bit periods, data stripper 43 detects this condition and relays through control circuit 47 to provide a predetermined break code to synchronous channel transmitter 48. In a preferred form, the break code is the data word 01111111.

Figure 9:
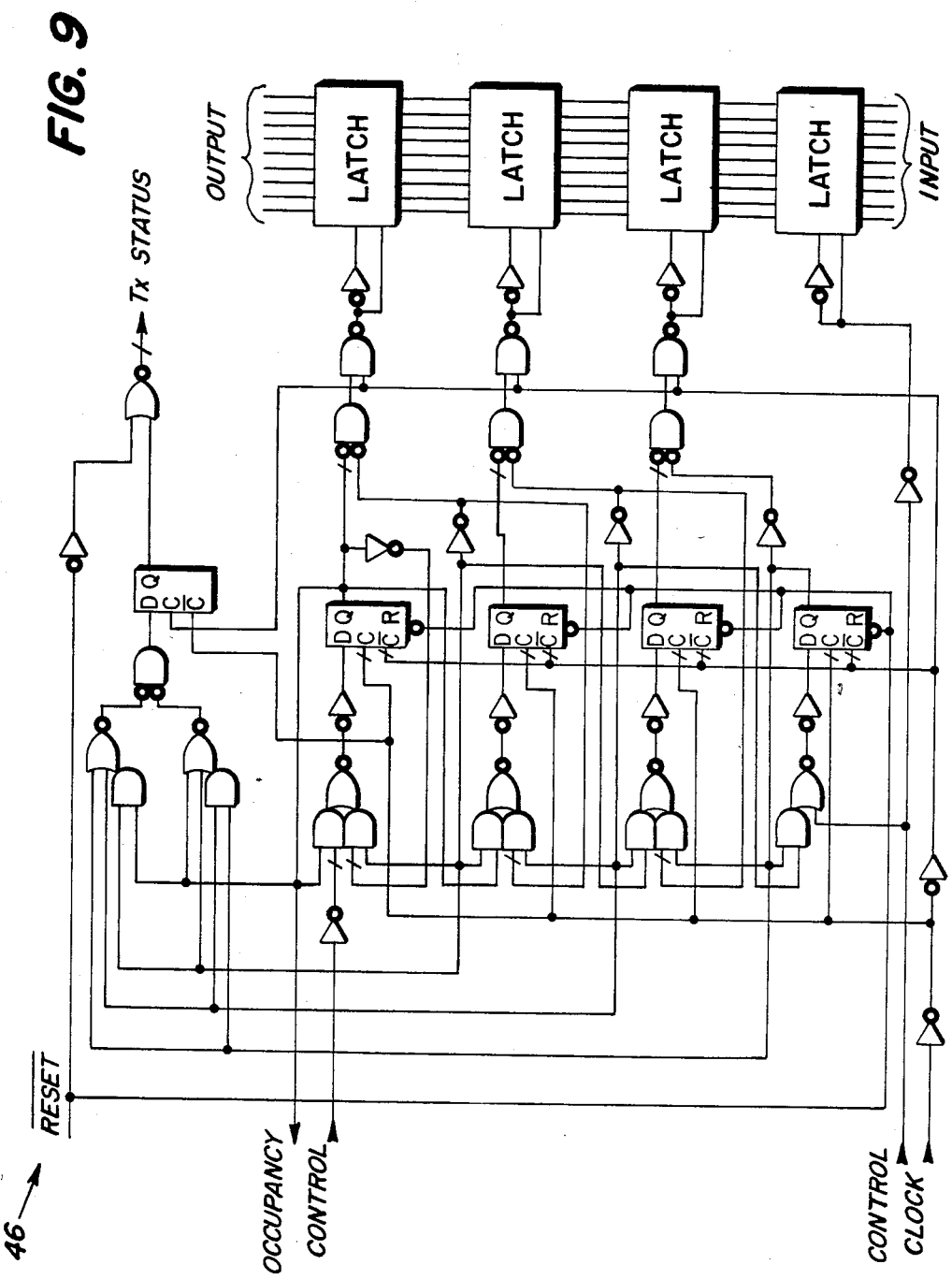
FIG. 9 illustrates in logic diagram form a transmit FIFO of the interface circuit of FIG. 6.

Referring to FIG. 9, transmit FIFO 46 in a preferred form is a four level first-in, first-out stack for buffering data between data stripper 43 and channel transmitter 48. Transmit FIFO 46 detects when any two levels thereof are full so that control circuit 47 can cause the transmit status signal to change logic level. A change in level of the transmit status signal merely informs data terminal 31 that if more data bits are coupled to interface circuit 33, a possibility of an overwrite of data exists. An overwrite condition will occur only if the asynchronous input data rate is higher than the predetermined synchronous channel data rate. Control circuit 47 controls the unloading of data from transmit FIFO 46 to transmitter 48 where the data is transmitted.

Figure 10:
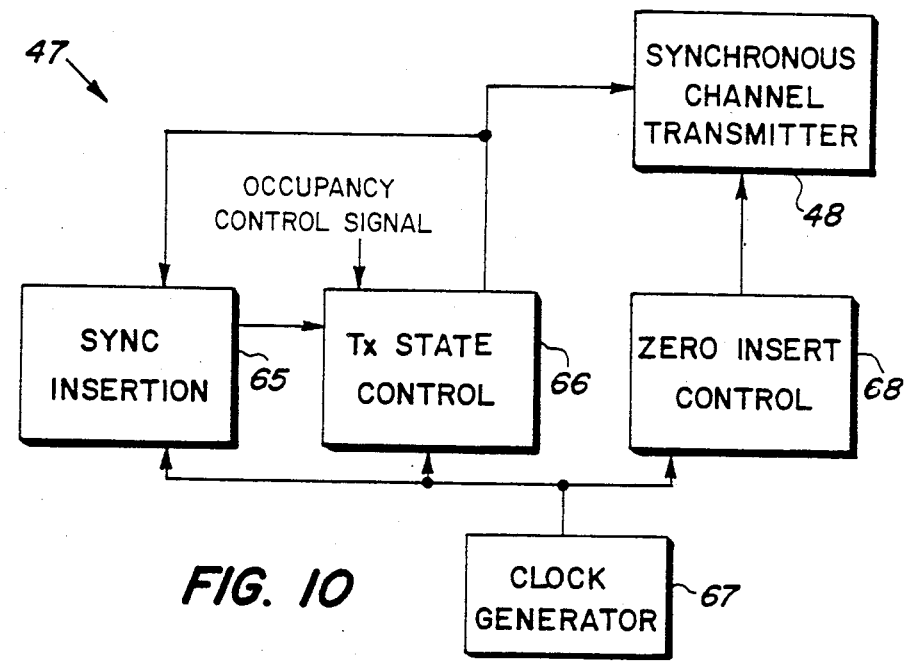
FIG. 10 illustrates in block diagram form a first control circuit of the interface circuit of FIG. 6.

Shown in FIG. 10 is a block diagram of control circuit 47 illustrating how control circuit 47 functions with synchronous channel transmitter 48 of FIG. 6. A sync insertion circuit 65 has an output coupled to a first input of a transmit state control circuit 66. A second input of transmit state control circuit 66 is coupled to the occupancy control signal. An output of transmit state control circuit 66 is coupled to a first input of sync insertion circuit 65 and to a first input of synchronous channel transmitter 48. A clock generator circuit 67 provides a clock signal to clock inputs of sync insertion circuit 65 and transmit state control circuit 66. A zero insert control circuit 68 has an output coupled to a second input of synchronous channel transmitter 48. A clock input of zero insert control circuit 68 is also coupled to the clock output of clock generator 67.

Figure 11:
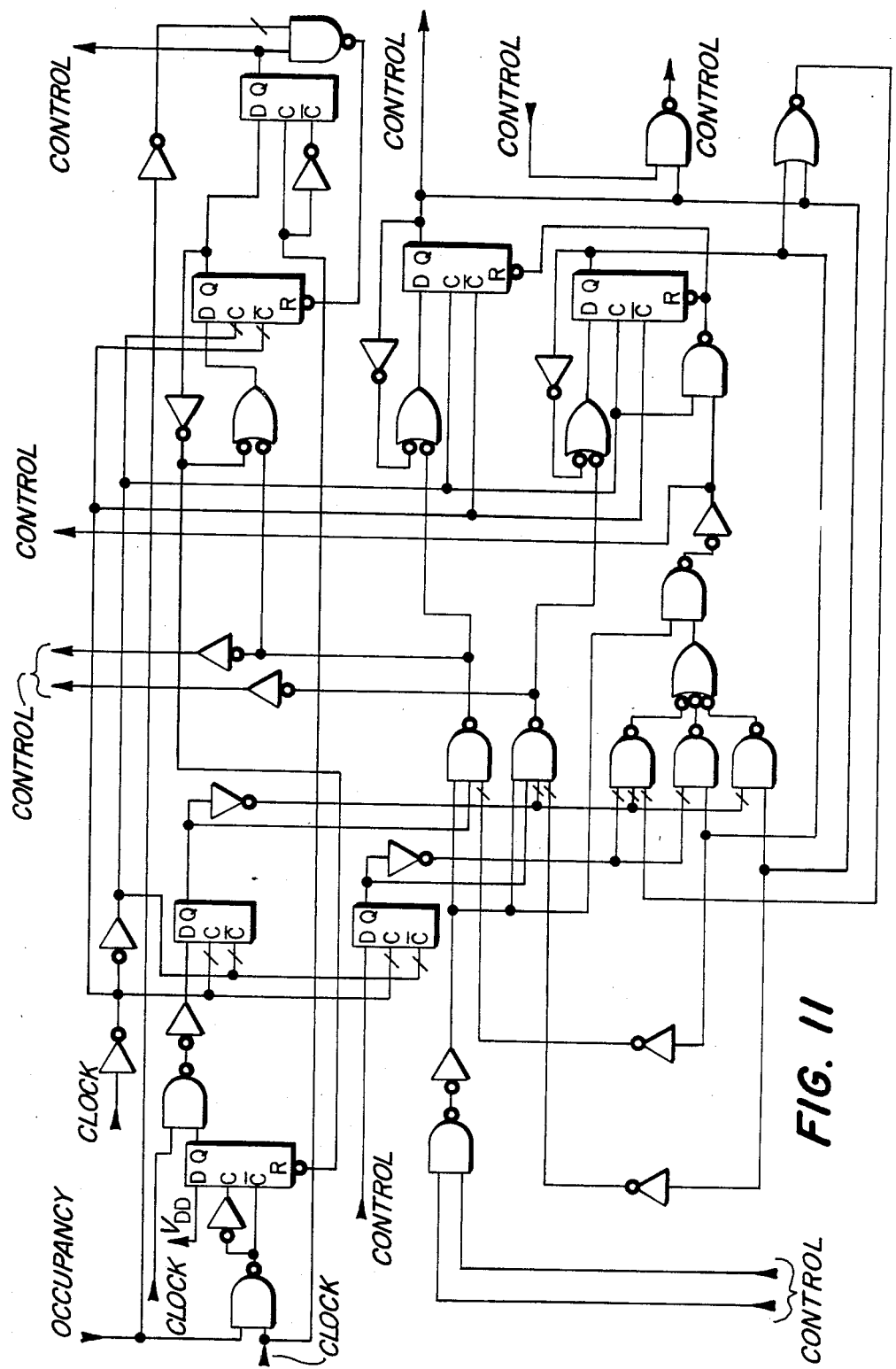
FIG. 11 illustrates in logic diagram form a transmission state circuit of the first control circuit of FIG. 10.

In operation, transmit state control circuit 66 determines whether the synchronous channel sends a flag idle code, a data word or a break code. Shown in FIG. 11 is a partial schematic diagram of transmit state control circuit 66. A counter (not shown in FIG. 11) is typically used to detect the last bit in a word being transmitted. The state of the next transmission is then determined and the proper bits are loaded from transmit FIFO 46 to synchronous channel transmitter 48. The state of the next transmission is determined in part by whether the top of FIFO 46 is full. If the top of FIFO 46 is full and the synchronous channel was transmitting either data or an idle flag code, data from the top of FIFO 46 will be immediately transmitted. If the synchronous channel was transmitting a break code, transmit state control circuit 66 will effect an idle flag code and wait until the last bit of the idle flag code to unload FIFO 46. If the top of FIFO 46 is not full and a break code condition is indicated, the new channel state will be the break state only if FIFO 46 is empty. A break state signal is ignored until FIFO 46 is empty. After FIFO 46 empties, an idle flag code automatically occurs. A break code may be transmitted by synchronous channel transmitter 48 only after an idle flag code.

Figure 12:
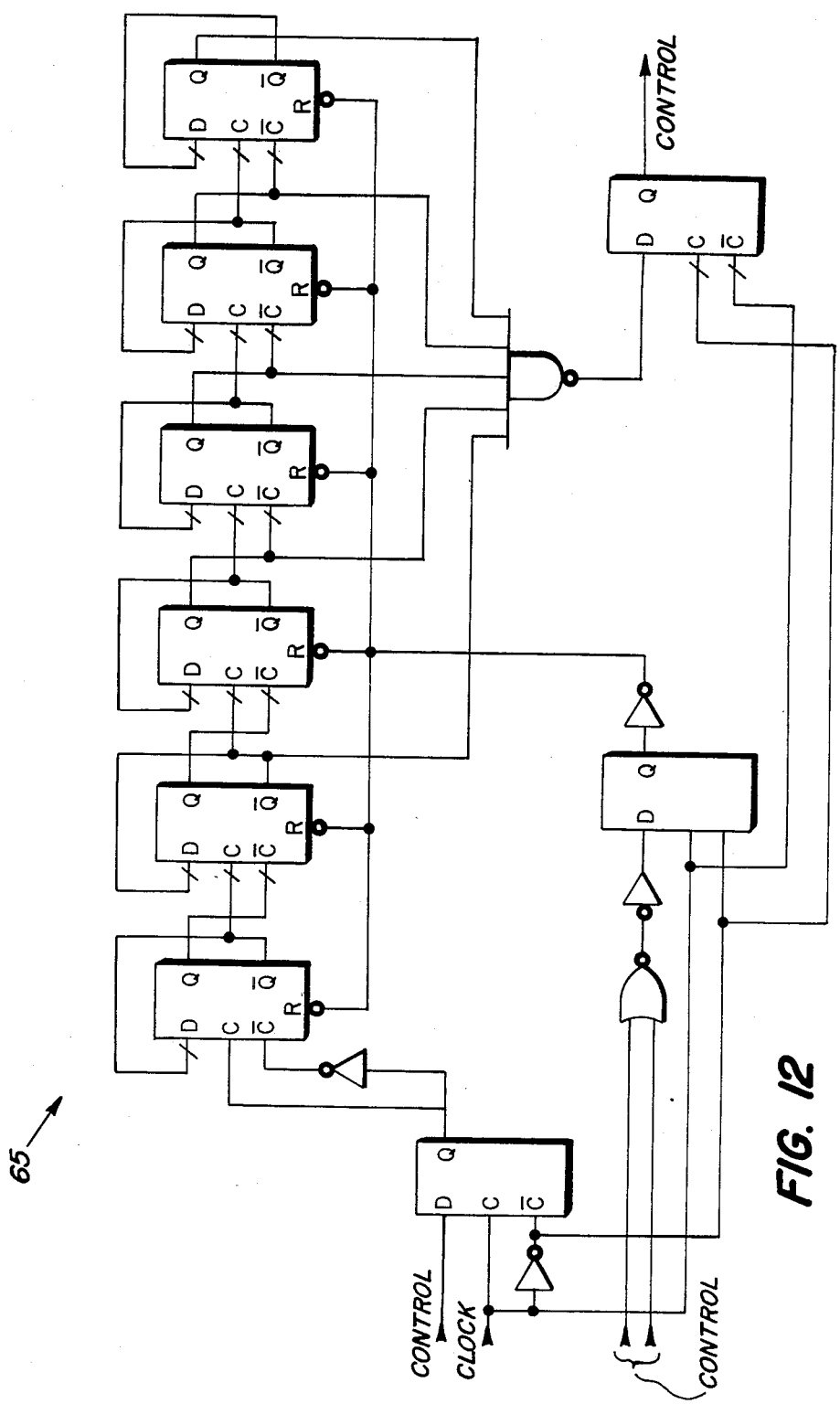
FIG. 12 illustrates in logic diagram form a sync insertion circuit of the first control circuit of FIG. 10.

In many instances, the clocks provided by the clock generators at the receive and transmit sides become skewed or the frequency of the incoming asynchronous data is such that the transmit state control circuit 66 goes into an idle flag or break code state. Idle flags or break codes function to synchronize the receive controller 53 with the transmitted data. However, for lengthy data transmissions or transmission errors, synchronization may be lost resulting in the loss of a bit of data. Therefore, periodic idle code insertion is sometimes performed by circuit 65 shown in detail in FIG. 12 and functions to generate an artificial synchronizing flag code if a predetermined number of consecutively transmitted data words occur.

Figure 13:
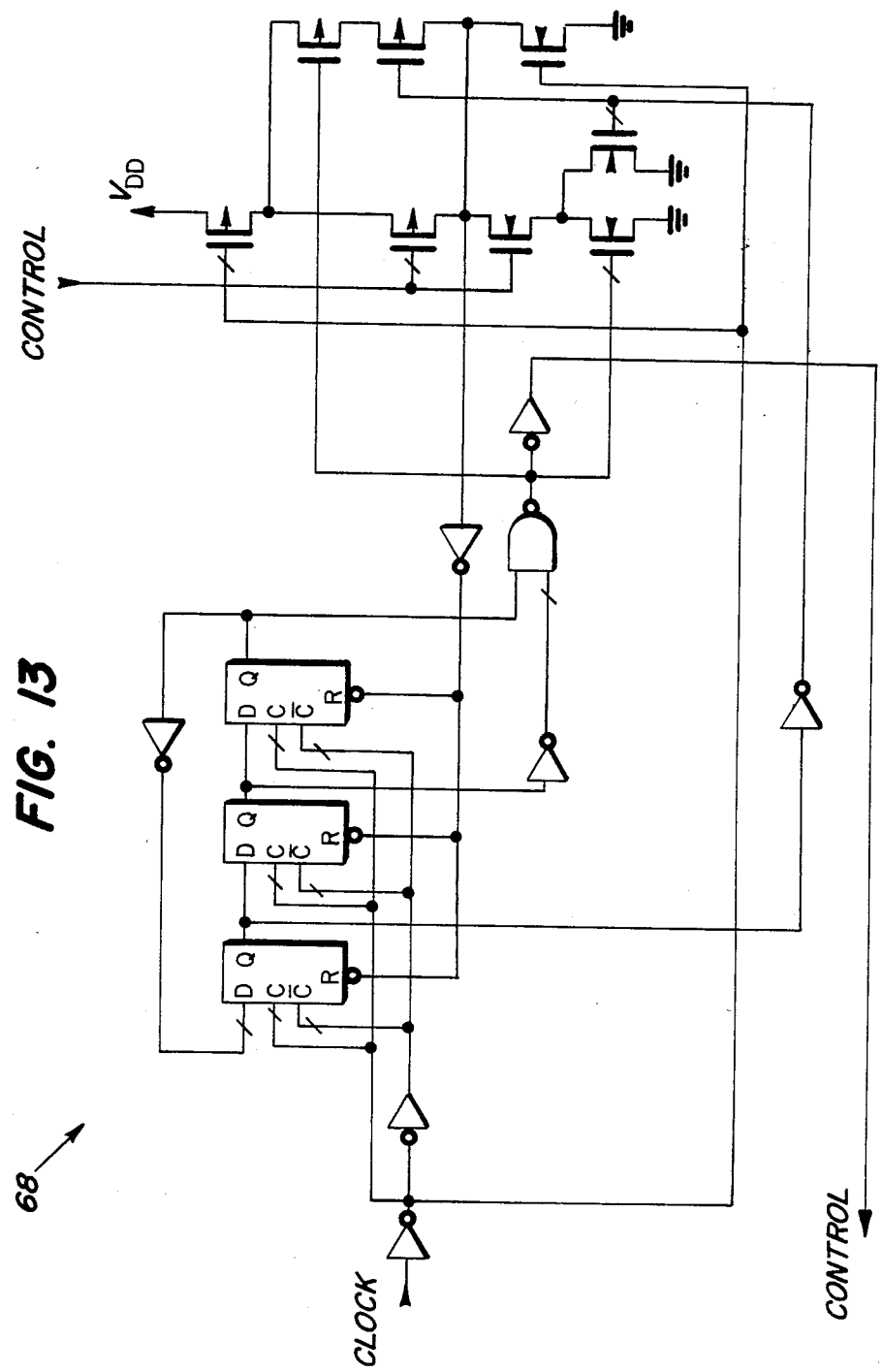
FIG. 13 illustrates in logic diagram form a zero bit insertion control circuit of the first control circuit of FIG. 10.

Shown in FIG. 13 is a partial schematic diagram illustrating zero insert control circuit 68 for performing the zero bit insertion inherent in the protocol previously discussed. By now it should be apparent that control circuit 47 functions to control the state (i.e. data, idle flag or break) of the synchronous data channel output of transmitter 48 so that when an information word, whether data or otherwise, reaches transmitter 48, the word is automatically synchronously clocked to the synchronous communication channel.

Figure 14:
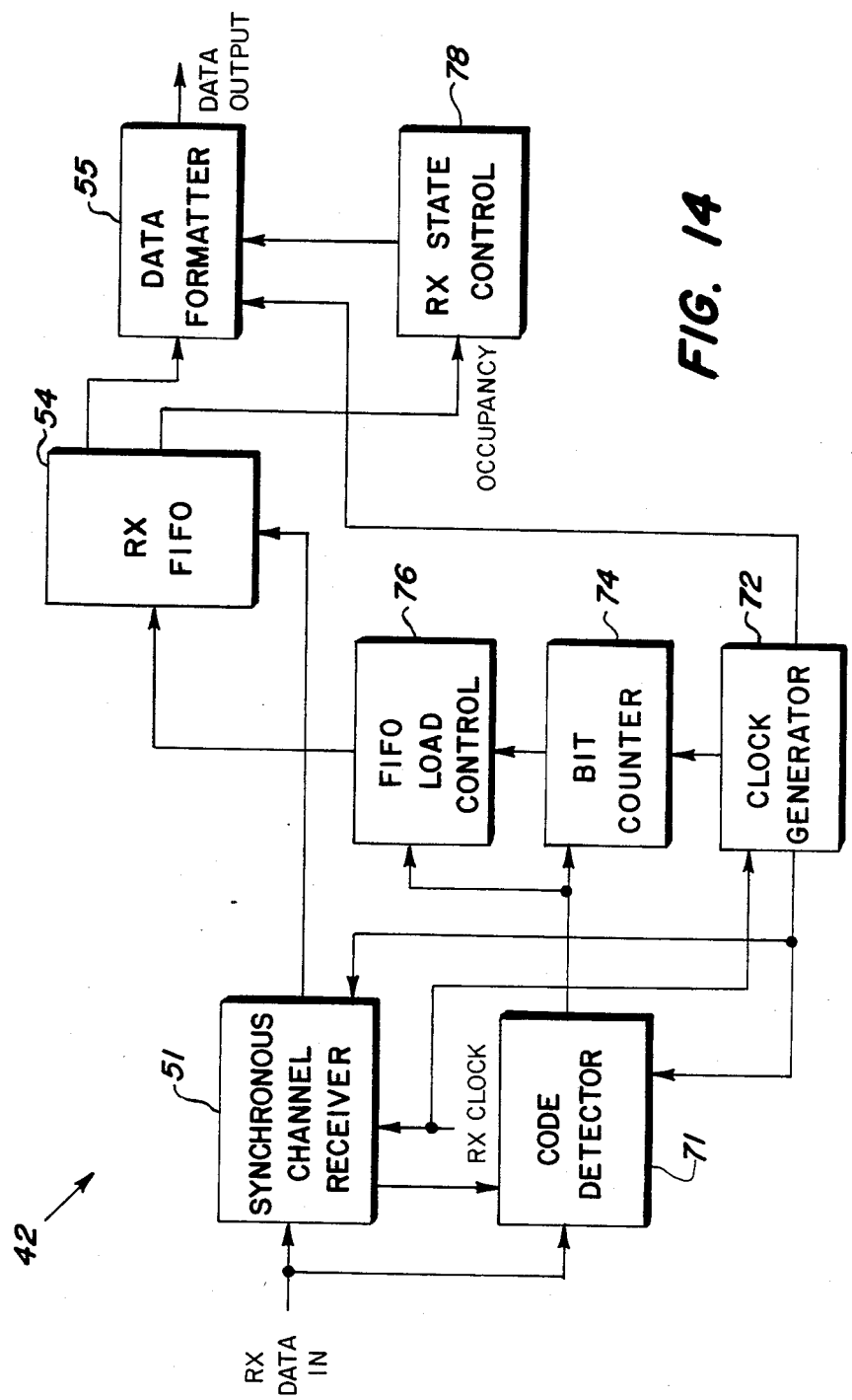
FIG. 14 illustrates in block diagram form a receive portion of the interface circuit of FIG. 6.

In the illustrated form, the operation of receive circuit 42 is analogous but the reverse of the operation of transmit circuit 41. Shown in FIG. 14 is a more detailed block diagram of receive portion 42 of FIG. 6. The elements previously illustrated in FIG. 6 are labeled by the same number and previously described circuit connections will not be repeated. A code detector 71 has a first input coupled to the input of synchronous channel receiver 51 for receiving synchronous input data. The first output of synchronous channel receiver 51 is coupled to the second input of code detector 71. A clock generator 72 has a first output coupled to a third input of code detector 71. A second output of clock generator 72 is coupled to a first input of a bit counter 74. An output of bit counter 74 is coupled to an input of a FIFO load control circuit 76. An output of FIFO load control circuit 76 is coupled to the third input of receive FIFO 54. The second output of receive FIFO 54 which provides the second occupancy control signal is coupled to an input of a receive state control circuit 78. An output of receive state control circuit 78 is coupled to a third input of data formatter 55.

Figure 15:
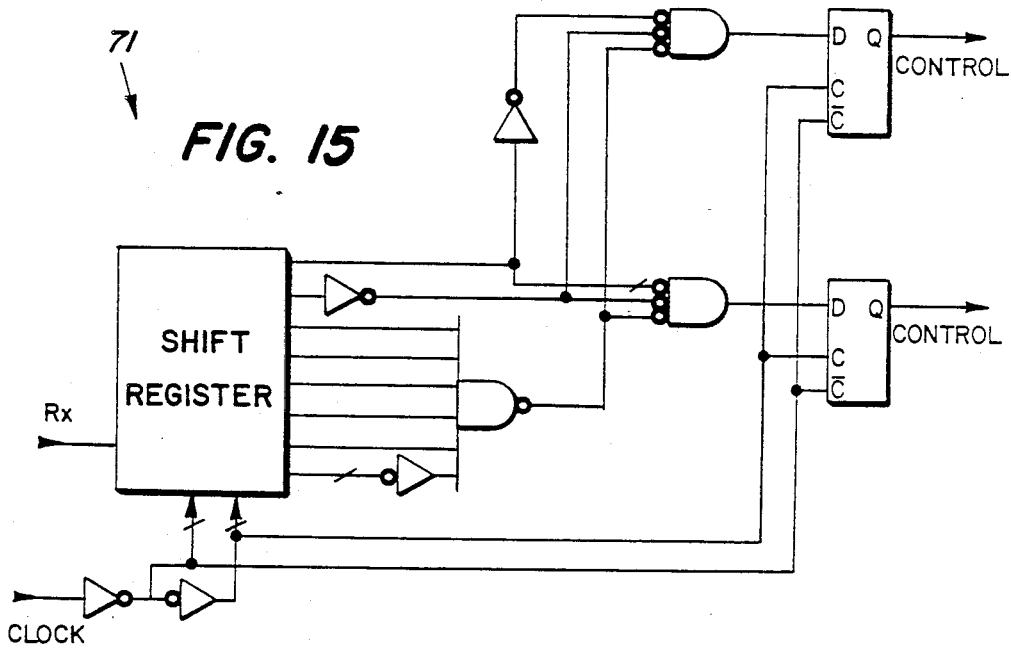
FIG. 15 illustrates in logic diagram form a code detector circuit, of the receive portion of the interface circuit of FIG. 14.
Figure 16:
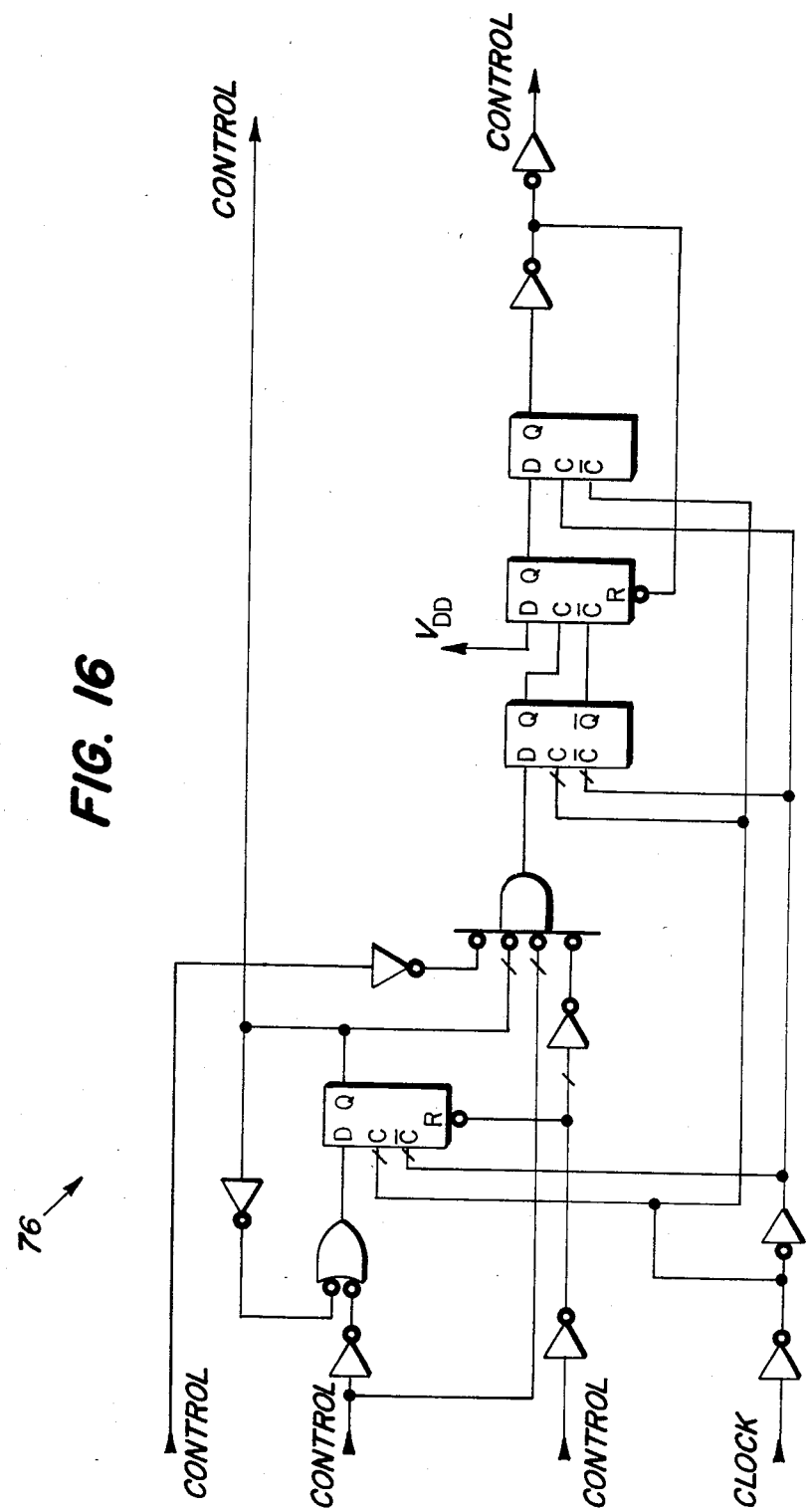
FIG. 16 illustrates in logic diagram form a FIFO load control circuit of the receive portion of the interface circuit illustrated in FIG. 14.

In operation, data, idle flag codes and break codes are synchronously received from data terminal 32 by both receiver 51 and code detector 71. In a preferred form, synchronous channel receiver 51 may be implemented as an n bit shift register, where n is the number of bits per data word being transmitted and received. Receiver 51 also functions to detect the presence of an inserted zero when a data word is received. After five consecutive ones are received, if the next bit is a zero, the zero is removed from the data stream before the data is coupled to receive FIFO 54. Once an input data word has been shifted into receiver 51, the input is parallel loaded into receive FIFO 54 in response to FIFO load control circuit 76. Initially, code detector circuit 71 accepts input words and stores the words by means such as a serial shift register. When an idle flag code or a break code is detected, code detector circuit 71 couples a detect signal to both FIFO load control circuit 76 and bit counter 74. In response thereto, FIFO load control circuit 76 couples an inhibiting control signal to receive FIFO 54 which prevents receive FIFO 54 from storing the input word because the input word was either an idle flag or a break flag. Bit counter 74 functions to count the predetermined number of bits contained in each input word. Once the length of an input word has been counted, the control signal from FIFO load control circuit 76 is removed if the next input word is determined by code detector circuit 71 to be data. From the receive clock provided by the synchronous data channel, clock generator 72 provides synchronous clock signals to the associated circuitry. An implementation of a plurality of possible implementations of code detector circuit 71 and FIFO load control circuit 76 are shown in FIGS. 15 and 16, respectively.

Figure 17:
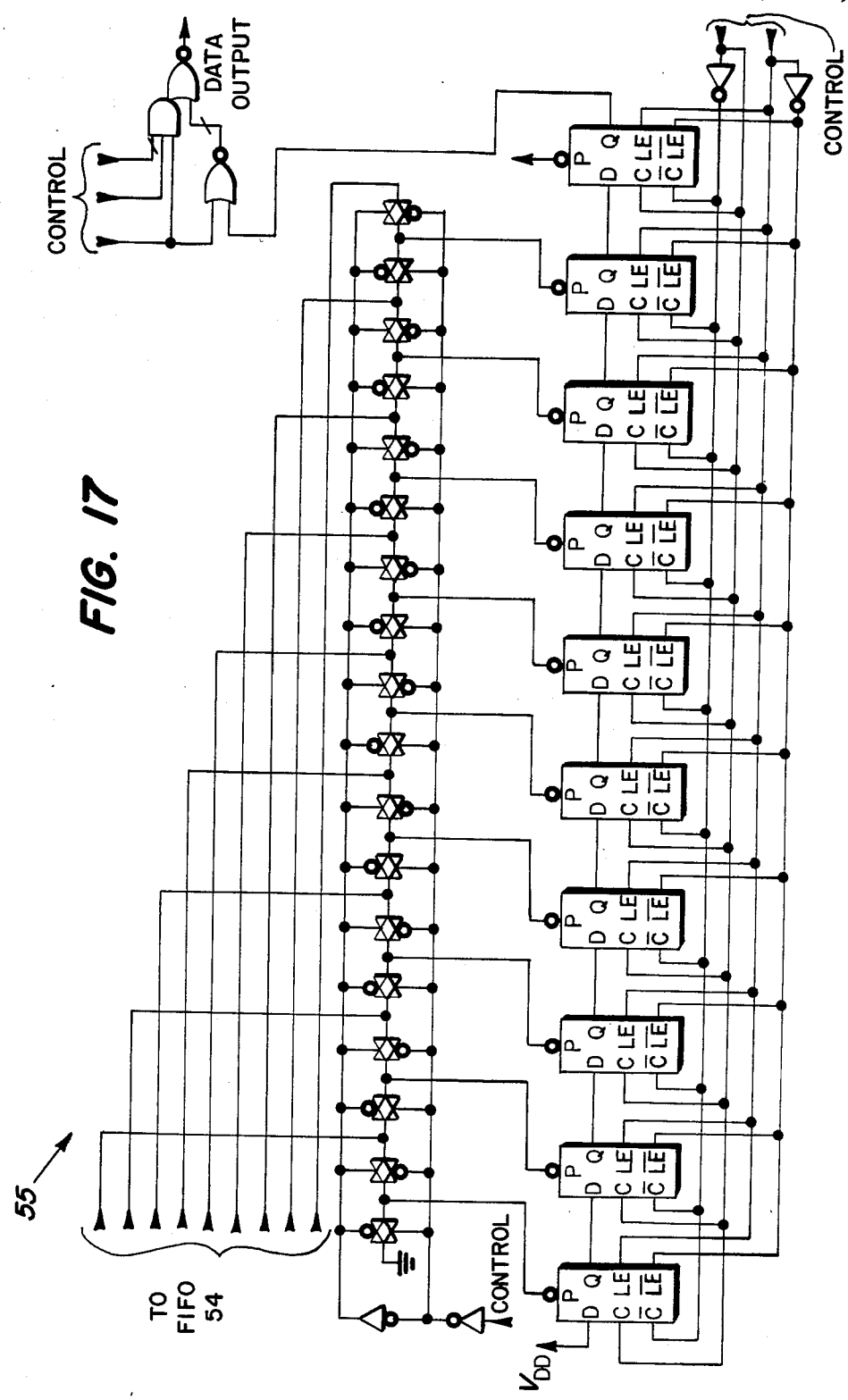
FIGS. 17 and 18 illustrate in logic diagram form a data formatter circuit of the receive portion of the interface circuit illustrated in FIG. 14.
Figure 18:
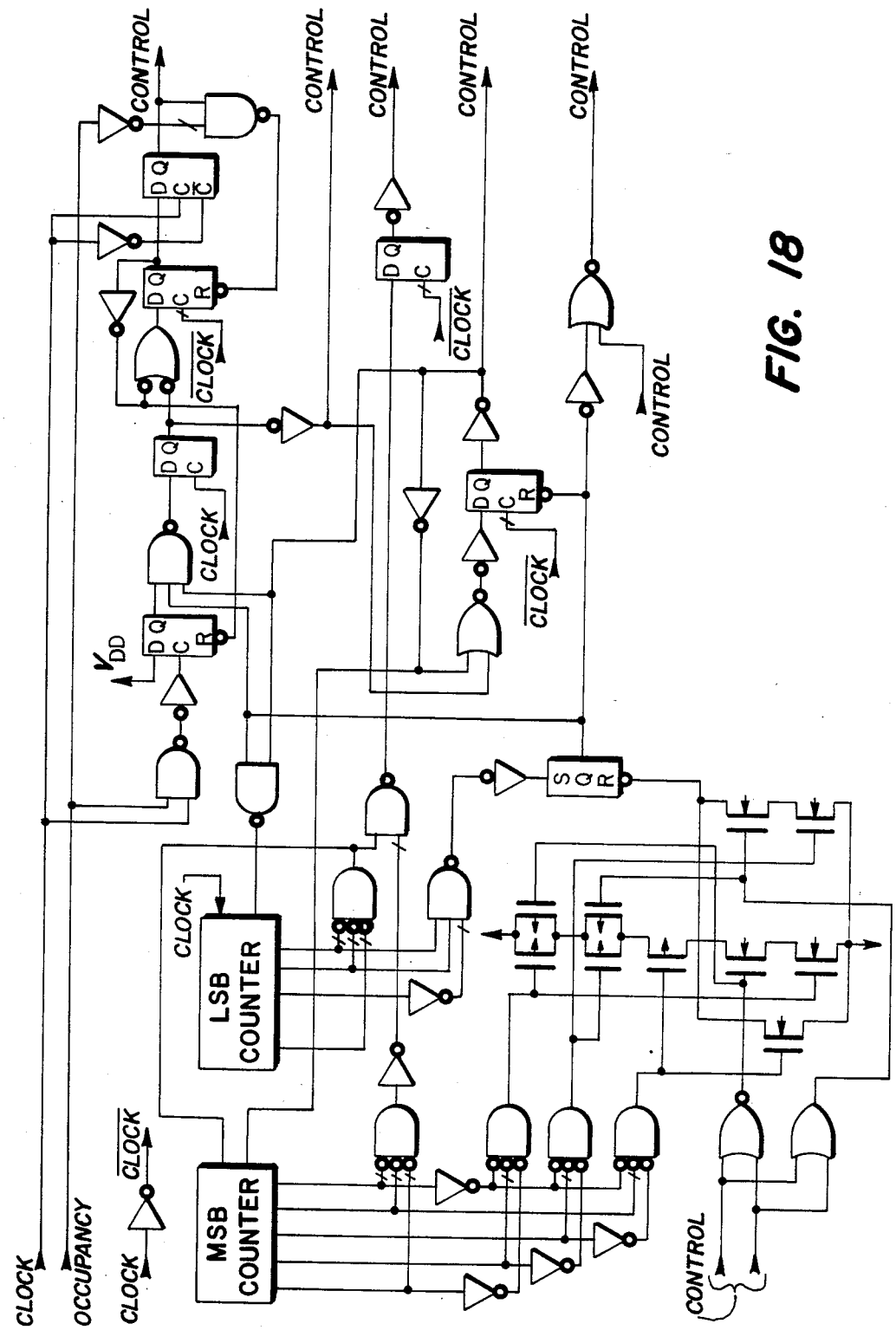

As in transmit portion 41, a FIFO is used to buffer the synchronous section and the asynchronous section of receive portion 42. Since FIFO 54 may be overwritten if the synchronous data rate is higher than the asynchronous data rate, the receive status signal is coupled to receive state control circuit 78 to indicate an overwrite or near overwrite condition. Data is coupled out of the top of FIFO 54 into data formatter 55 in response to the second occupancy control signal. Once data is coupled to data formatter 55, a start bit and one or more stop bits are added at the beginning and end, respectively, of each data word. If the top of FIFO 54 is empty, data formatter 55 returns to the idle flag state in response to the control of receive state control circuit 78. State control circuit 78 functions to control the state of the asynchronous output depending upon what is at the top of FIFO 54. The detection of either the break code or the idle flag code by state control circuit 78 causes data formatter 78 to output either a continuous idle signal or a break signal. One of many possible implementations of data formatter circuit 55 and receive state control circuit 78 are shown in detail in FIGS. 17 and 18, respectively.

Because of the start and stop bit stripping in the conversion from asynchronous data to synchronous data, the synchronous communication channel is utilized with maximum efficiency. As a result, 9600 bits per second asynchronous data may be transmitted via a conventional synchronous 8K bits per second channel. Since at least two bits are needed for start and stop bit purposes, only eight out of ten asynchronous bits which are transmitted are actual data. Therefore, when the asynchronous channel data rate is 9600 bits per second, the actual data rate is only 7680 bits per second which can be transmitted in an 8K bits per second synchronous communication channel. Since the synchronous data rate must only be equal to or slightly greater than the actual data rate, the present invention provides improved data transmission rates since the asycnhronous data rate is always going to be greater than the actual data rate due to associated overhead of asycnhronous data.

By now it should be clear that an interface circuit for interfacing between a data terminal providing asynchronous data and a synchronous communication channel has been provided. A common application of the present invention is for use with voice/data digital telephone sets where an asynchronous net link is coupled to the synchronous channel of the telephone set. However, the present invention is useful in any application requiring the conversion of synchronous to asynchronous data and vice versa.

We claim:

1. In a communication system having first and second asynchronous data terminals coupled via a synchronous communication channel, an interface circuit for interfacing between the first data terminal and the synchronous communication channel, comprising:

a transmit portion for transmitting synchronous data words to the communication channel upon receipt of asynchronous data words from the first data terminal, each asynchronous data word having a start bit and at least one stop bit separating a predetermined number of data bits, said transmit portion transmitting the data from the first data terminal in frames having one or more data words while maintaining synchronization and frame boundary definition by providing synchronous idle codes in the absence of data words; and a receive portion for synchronously receiving the transmitted synchronous idle codes and data frames of varying data word size from the second data terminal, each of said data frames having an idle code at the beginning and end of each data frame, said receive portion adding a start bit at the beginning of each received data word and at least one stop bit at the end of each received data word, and asynchronously providing each received data word in start/stop format to the first data terminal.

2. The communication system of claim 1 wherein the transmit portion further comprises:

data stripping means having an input for receiving asynchronous data in start/stop format from the first data terminal, and an output for providing the data after stripping the start and stop bits;

rate adaption storage means having an input coupled to the output of the data stripping means, a control input, and an output, said rate adaption storage means asynchronously receiving and storing the data from the data stripping means;

transmitter means coupled to the output of the rate adaption storage means for synchronously transmitting data from the rate adaption storage means and synchronously transmitting idle codes otherwise; and control means coupled to the control input of the rate adaption storage means, to the transmitter means and to the data stripping means, for controlling the synchronous transmission of data and idle codes.

3. The communication system of claim 2 wherein the rate adaption storage means is a first-in, first-out shift register.

4. The communication system of claim 2 further comprising:

clock means coupled to the data stripping means and the rate adaption storage means, for providing clock signals to control the rate of clocking data from the data stripping means to the rate adaption storage means and the transmitter means.

5. The communication system of claim 2 wherein the control means further comprise:

break signal means for detecting the receipt of a break signal from the first data terminal, and providing a break control signal to said transmitting means.

6. The communication system of claim 5 wherein the transmitter means further comprise:

break code transmit means to provide a break condition code to the synchronous communication channel in response to the break control signal.

7. The communication system of claim 1 wherein said receive portion further comprises:

synchronous receiver means having an input for synchronously receiving data words and idle codes from the synchronous communication channel, and an output;

rate adaption storage means having an input coupled to the output of the synchronous receiver means, a control input, and an output for asynchronously providing data words;

data formatting means having an input coupled to the output of the rate adaption storage means, for adding a start bit and one or more stop bits to each data word provided by the rate adaption storage means, and for providing asynchronous data in start/stop format at an output thereof; and control means coupled to the control input of the rate adaption storage means and to the synchronous receiver means, for controllably coupling received data from the rate adaption storage means to the data formatting means.

8. The communication system of claim 7 wherein the rate adaption storage means is a first-in, first-out shift register.

9. The communication system of claim 7 further comprising:

clock means for providing clock signals to the rate adaption storage means and the data formatting means, for controlling the rate in which data is asynchronously outputted by the data formatting means.

10. The communication system of claim 9 wherein the synchronous receiver means further comprise:

break code receive means for detecting receipt of a break condition code and for providing a break signal in response thereto.

11. The communication system of claim 10 wherein the control means further comprise:

break signal means for detecting the receipt of the break signal and for coupling the break signal to the first data terminal.

12. An interface circuit for use in a communication system having a synchronous communication channel and an asynchronous data source, comprising:

a transmit portion for receiving asynchronous data words from the asynchronous data source, each data word having a start bit and at least one stop bit separating a predetermined number of data bits, said transmit portion transmitting the data in frames having one or more data words while maintaining synchronization and frame boundary definition by providing synchronous idle codes at the beginning and end of each frame, said transmit portion synchronously providing the idle codes in the absence of data words; and a receive portion for synchronously receiving idle codes and data frames of varying data word size, each of said data frames having an idle code at the beginning and end of each data frame, said receive portion adding a start bit at the beginning of each received data word, and asynchronously providing each received data word in start/stop format to the first data terminal.

13. A method of interfacing data between an asychronous data source providing asychronous data words in start/stop format and a synchronous communication channel, comprising the steps of:

receiving asychronous data words from the asychronous data source and transmitting the received words in frames having one or more data words while maintaining synchronization and frame boundary definition by providing synchronous idle codes at the beginning and end of each frame;

providing the synchronous idle codes to said synchronous communication channel in the absence of data from the asychronous data source;

receiving from the synchronous communication channel the synchronous idle codes and data frames of varying data word size, each of said data frames being preceeded and followed by a synchronous idle code;

formatting the data by adding a start bit and at least one stop bit at the beginning and end, respectively, of each data word; and asynchronously coupling the formatted data to the asychronous data source.

* * * * *